United States Patent
Kruglick

(10) Patent No.: US 9,058,165 B2
(45) Date of Patent: Jun. 16, 2015

(54) DEVICE POWER MANAGEMENT USING COMPILER INSERTED DEVICE ALERTS

(75) Inventor: Ezekiel Kruglick, Poway, CA (US)

(73) Assignee: Empire Technology Development LLC, Wilmington, DE (US)

(*) Notice: Subject to any disclaimer, the term of this patent is extended or adjusted under 35 U.S.C. 154(b) by 603 days.

(21) Appl. No.: 13/264,702

(22) PCT Filed: May 5, 2011

(86) PCT No.: PCT/US2011/035399
§ 371 (c)(1),
(2), (4) Date: Oct. 14, 2011

(87) PCT Pub. No.: WO2012/150944
PCT Pub. Date: Nov. 8, 2012

(65) Prior Publication Data
US 2012/0284537 A1    Nov. 8, 2012

(51) Int. Cl.
*G06F 1/32*    (2006.01)

(52) U.S. Cl.
CPC ............ *G06F 1/3203* (2013.01); *G06F 1/3287* (2013.01)

(58) Field of Classification Search
CPC .................................................. G06F 9/30083
See application file for complete search history.

(56) References Cited

U.S. PATENT DOCUMENTS

| | | | |
|---|---|---|---|
| 5,878,264 A | 3/1999 | Ebrahim | |
| 2002/0108064 A1* | 8/2002 | Nunally | 713/300 |
| 2004/0002823 A1* | 1/2004 | Aldridge et al. | 702/60 |
| 2006/0179329 A1* | 8/2006 | Terechko et al. | 713/300 |
| 2007/0106914 A1 | 5/2007 | Muthukumar | |
| 2008/0201591 A1* | 8/2008 | Hu et al. | 713/323 |
| 2009/0259861 A1 | 10/2009 | Tume | |
| 2010/0309884 A1 | 12/2010 | Haverty | |
| 2011/0088022 A1 | 4/2011 | Kruglick | |

FOREIGN PATENT DOCUMENTS

KR    20050085281 A    6/2005

OTHER PUBLICATIONS

United States Patent and Trademark Office, International Search Report and Written Opinion of the International Searching Authority for PCT/US11/35399, prepared on Aug. 8, 2011 and mailed on Aug. 31, 2011, United States.

Hwang, Young-Si et al., A predictive dynamic power management technique for embedded mobile devices, Consumer Electronics, IEEE Transactions, Jun. 29, 2010 vol. 56, No. 2, pp. 713-719.

Wu, Qiang et al., A dynamic compilation framework for controlling microprocessor energy and performance, Proceedings of the 38th Annual IEEE/ACM International Symposium on Microarchitecture (MICRO'05), 2005.

Rauch, Michael et al., Dynamic Power Management for—and by—a java virtual machine, 2006, accessed online on Oct. 14, 2011 via http://citeseerx.ist.psu.edu/viewdoc/summary?doi=10.1.1.131.4343.

(Continued)

*Primary Examiner* — Paul Yanchus, III
*Assistant Examiner* — Joshua Neveln

(57) ABSTRACT

Technologies and implementations for device power management using compiler inserted device alerts are generally disclosed. In an example, a thin binary including a call to a device subsystem may be compiled at the device to produce an instruction stream including a device power management alert for the device subsystem inserted in the instruction stream before a call to the device subsystem.

24 Claims, 5 Drawing Sheets

(56) References Cited

OTHER PUBLICATIONS

Weissel, Andreas and Frank Bellosa, Process cruise control: event-driven clock scaling for dynamic power management, CASES 2002, Oct. 8-11, 2002, Grenoble, France, ACM.

Albonesi, D. H., "Selective Cache Ways: On-Demond Cache Resource Allocation," MICRO-32. Proceedings. 32nd Annual International Symposium on Microarchitecture, pp. 248-259 (Nov. 16-Nov. 18, 1999).

Bala, V., et al., "Dynamo: A Transparent Dynamic Optimization System," PLDI '00 Proceedings of the ACM SIGPLAN 2000 conference on Programming language design and implementation, pp. 1-12 (2000).

Baraz, L., et al., "IA-32 Execution Layer: a Two-Phase Dynamic Translator Designed to Support IA-32 Applications on Itanium-based Systems," Proceedings of the 36th International Symposium on Microarchitecture, pp. 1-11 (2003).

Dehnert, J.C., et al., "The Transmeta Code Morphing Software: Using Speculation, Recovery, and Adaptive Retranslation to Address Real-Life Challenges," Proceedings of the First Annual IEEE/ACM International Symposium on Code Generation and Optimization, pp. 15-24 (Mar. 27-29, 2003).

Ebcioglu, K., and Altman, E. R., "DAISY: Dynamic Compilation for 100% Architectural Compatibility," Proceedings of the 24th International Symposium on Computer Architecture, pp. 26-37 (Jun. 2-4, 1997).

\* cited by examiner

200

```
Receive a Thin Binary Including a Call to a Device Subsystem
                                                         210
```

```
Compile the Thin Binary to Produce an Instruction Stream Having
              a Device Power Management Alert
                                                         220
```

```
Execute the Instruction Stream at the Device
                                                         230
```

Fig. 2

400 A computer program product

402 A signal bearing medium 404 at least one of one or more instructions for formatting data to receive a thin binary at the device, wherein the thin binary includes a call to a device subsystem;

one or more instructions for formatting data to compile the thin binary at the device to produce an instruction stream including a device power management alert for the device subsystem inserted in the instruction stream before the call to the device subsystem; or one or more instructions for formatting data to execute the instruction stream at the device, wherein the device subsystem is powered up from a shut down state in response to the power management alert in the instruction stream being executed.

| 406 a computer-readable medium | 408 a recordable medium | 410 a communications medium |

Fig. 4

DEVICE POWER MANAGEMENT USING COMPILER INSERTED DEVICE ALERTS

CROSS-REFERENCE TO RELATED APPLICATIONS

The present application is a U.S national stage filing under 35 U.S.C. §371 of International Application No. PCT/US11/035399, filed on May 5, 2011, which is hereby incorporated by reference in its entirety.

BACKGROUND

Unless otherwise indicated herein, the approaches described in this section are not prior art to the claims in this application and are not admitted to be prior art by inclusion in this section.

Device power management techniques may turn off power to unused device subsystems to reduce energy consumption, prolong battery life and to reduce the cost of operating the device. It may be desirable to provide device power management techniques that keep device subsystems in a powered off state for greater periods of time while having the device subsystems in a ready state when needed for operation such that the user does not perceive a lag time or delay in the operation of the device.

SUMMARY

The present disclosure describes example methods for providing power management at a device. Examples methods may include receiving, at the device, a thin binary that includes a call to a device subsystem, compiling the thin binary to produce an instruction stream having a device power management alert for the device subsystem inserted in the instruction stream before the call to the device subsystem, and executing the instruction stream such that device subsystem is powered up from a shut down state in response to the power management alert in the instruction stream being executed.

The present disclosure also describes example machine readable non-transitory media having stored therein instructions that, when executed by a device, provide power management for the device by receiving a thin binary that includes a call to a device subsystem, compiling the thin binary to produce an instruction stream including a device power management alert for the device subsystem inserted in the instruction stream before the call to the device subsystem, and executing the instruction stream such that the device subsystem is powered up from a shut down state in response to the power management alert in the instruction stream being executed.

The present disclosure also describes example devices. The devices may include a processor and a machine readable medium having stored therein instructions that, when executed by the processor, cause the device to provide power management for the device by receiving a thin binary that includes a call to a device subsystem and compiling the thin binary to produce an instruction stream including a device power management alert for the device subsystem inserted in the instruction stream before the call to the device subsystem such that the device subsystem is powered up from a shut down state in response to the power management alert in the instruction stream being executed.

The foregoing summary may be illustrative only and may not be intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings:

FIG. 2 is an illustration of a flow chart of an example method for providing power management at a device;

FIG. 4 is an illustration of an example computer program product; and

DETAILED DESCRIPTION

Figure 1:
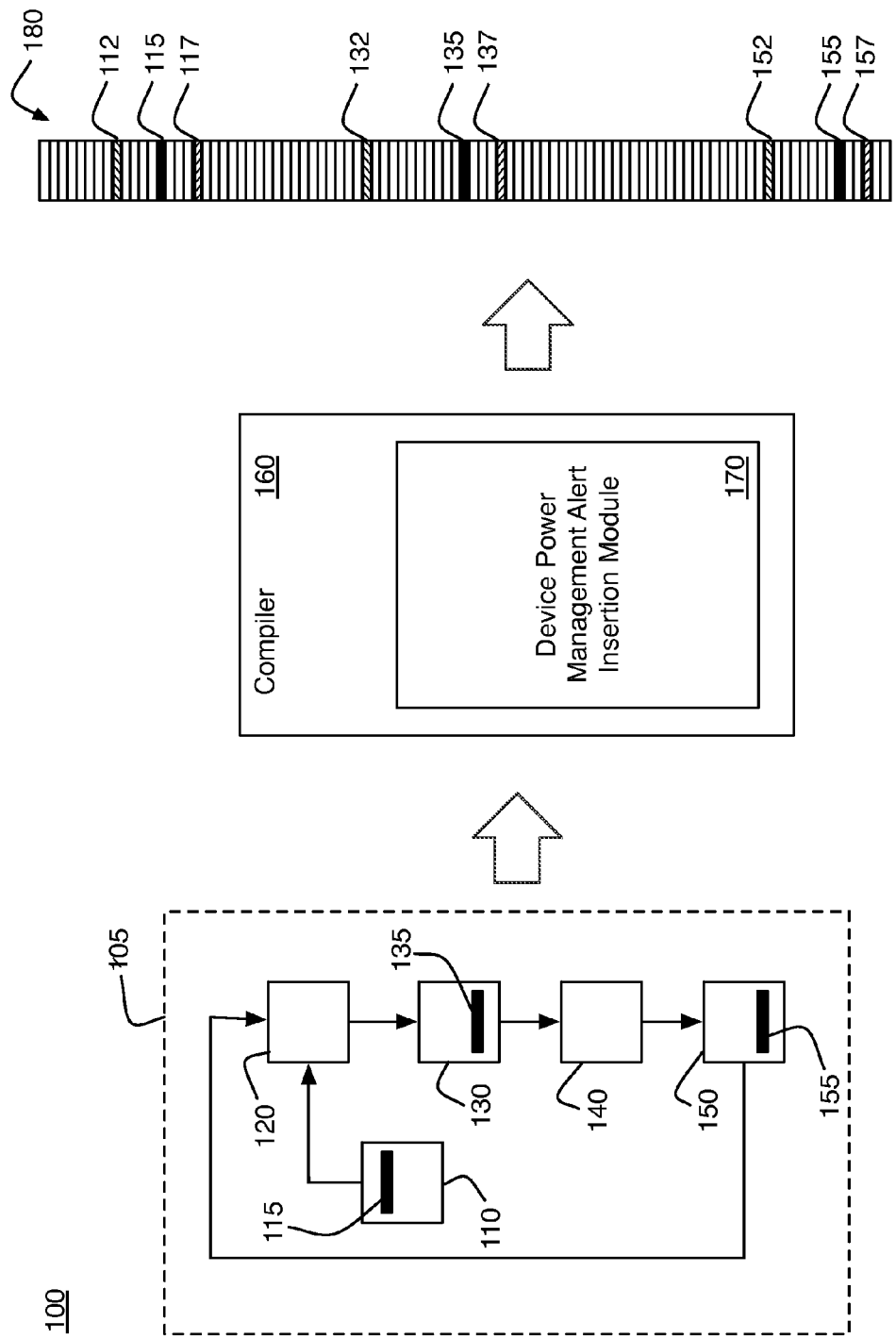
FIG. 1 is an illustration of a block diagram of an example method for compiling a thin binary to produce an instruction stream including a device power management alert.

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

The following description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, devices, systems and computer readable media related to providing device power management.

In some examples, device power management may provide for reduced energy consumption, prolonged battery life and/or reduced costs related to operating the device. In some examples, device power management may include evaluating a thin binary at a compiler. The thin binary may, in general, include any partially compiled code or script that may be further compiled to generate an executable instruction stream for a device to execute. The thin binary may include a variety of calls to various device subsystems. In general, the device subsystems may be held in a powered down state when not in use to provide for power savings. The device subsystems held in a powered down or standby state may need to warm up prior to use while coming out of a powered down state. For example, a hard disk or a radio may require tens of milliseconds to come out of a powered down or sleep mode. In some examples, during the compiling of the thin binary, a call to a device subsystem may be identified. Based on the identified call to the device subsystem, the compiler may insert a device power management alert into the instruction stream. The device power management alert may, during execution of the instruction stream, alert the device subsystem to warm up. Thereby, the device subsystem may be in a ready state before the call to the device subsystem. Such techniques may provide for device subsystems to remain in a powered off state for greater periods of time while allowing the device subsystems warning and time to be in a ready state when needed for operational call in the thin binary such that the user does not perceive a lag time or delay in the device operation.

FIG. 1 is an illustration of a block diagram of an example method 100 for compiling a thin binary to produce an instruction stream including a device power management alert, arranged in accordance with at least some embodiments of the present disclosure. In general, the method of FIG. 1 may be performed at any suitable device such that the compiler device may compile a thin binary to form an instruction stream for a known target device to include appropriate power management alerts in the resultant instruction stream. In some examples, the compiling device may be the same device at which the instruction stream is to be executed. In other examples, the thin binary may be compiled at a local intermediate compiler device for subsequent download to an execution device at which the instruction stream is to be executed. In such examples, the local intermediate compiler device may have or may have access to the necessary information related to the execution device such that the thin binary may be compiled specifically for that known execution device.

In some examples, the device may be a mobile phone (e.g., a smartphone), a tablet device, a laptop computer, a desktop computer, a server, or any of the devices discussed herein. As shown in FIG. 1, method 100 may include a thin binary 105 compiled by a compiler 160 to form an instruction stream 180. In some examples, thin binary 105 may include modules 110, 120, 130, 140 and 150. The modules may include, for example, software modules. In some examples, the modules may include calls to device subsystems. In the illustrated example, module 110 includes a device subsystem call 115, module 130 includes a device subsystem call 135, and module 150 includes a device subsystem call 155 The device subsystem calls may include a request for a device subsystem, such as, for example, a hardware component, to take an action. In some examples, the subsystem device may be inactive and/or unneeded prior to the device subsystem call.

In some examples, thin binary 105 may include a partially compiled binary code or a partially compiled script that may be further compiled at the device to generate an executable instruction stream. In some examples, thin binary 105 may be considered a thin binary code. In such examples where thin binary 105 includes a partially compiled script, the script may include any suitable scripting language. In some examples, as shown in FIG. 1, thin binary 105 may include modules that may be organized in a flow chart. In general, thin binary 105 may be organized in any suitable manner. In some examples, thin binary 105 may be code for an application for the device. In various examples, the application may include a communication application (e.g., text messaging, e-mail, social networking, etc.), an entertainment application (e.g., games, video players, music players, etc.), a productivity application (e.g., finance, maps, education, etc.), or the like. In some examples, thin binary 105 may include Java bytecode. In some examples, thin binary 105 may include .NET dynamic optimization code. In some examples, thin binary 105 may include a script such as a partially compiled Java script.

As shown, in some examples, compiler 160 may include a device power management alert insertion module 170. In general, compiler 160 may compile thin binary 105 to form instruction stream 180. Instruction stream 180 may be any suitable instruction stream such as, for example, a bytecode stream, a native instruction stream, or the like. As discussed, compiler 160 may insert or inject a device power management alert into the instruction stream prior to a call to a device subsystem. In some examples, the device power management alert may be considered a device alert or warning to the device subsystem such that the device subsystem may warm up prior to being needed to execute a function for the device. FIG. 1 illustrates device power management alerts 112, 132, 152 inserted in instruction stream 180 prior to device subsystem calls 115, 135, 155, respectively. In some examples, the device power management alerts may be inserted into the instruction stream by device power management alert insertion module 170.

In some examples, device power management alerts 112, 132, 152 may precede device subsystem calls 115, 135, 155 by a time duration (or clock cycle count) related to the time it takes for the subsystem to be called to power up to a ready state. In some examples, the device power management alert may be inserted in the instruction stream before the call to the device subsystem such that a duration between execution of the power management alert and execution of the call to the device subsystem is equal to or greater than a warm up duration of the device subsystem. Further, the time required for each device subsystem to warm up may be specific to the device subsystem. For example, a Wi-Fi device may take longer to warm up than a graphics processor unit. In the illustrated example, device power management alert 112 may be inserted before device subsystem call 115 leaving a shorter duration for warm up than device power management alert 132 provides before device subsystem call 135.

The time duration by which a device subsystem alert may precede a device subsystem call may be any suitable time duration. In some examples, the time duration may allow the device subsystem sufficient warning to completely warm up prior to the device subsystem call. In some examples, the time duration may allow the device subsystem warning to partially warm up. In such examples, the call to the device subsystem may experience a slight delay but the delay may not provide a lag or diminished user experience to the device user. In some examples, the time duration may be in the range of about 1 to 10 milliseconds. In some examples, the time duration may be in the range of about 10 to 50 milliseconds. In some examples, the time duration may be in the range of about 50 to 200 milliseconds.

As discussed, the device power management alert may be inserted before the device subsystem call in a manner related to the time it takes for the device subsystem to warm up. Such techniques may maximize the time device subsystems may be in a powered down state. In other examples, all device power management alerts may be inserted before the device subsystem calls in a uniform manner such that the duration between the alerts and the delays may be constant. Such techniques may not maximize device subsystem downtime but they may offer the advantages of simplicity and lower risk that the compiling misidentifies a call to a device subsystem. In some examples, the device power management alerts may be inserted before the device subsystem calls such that the duration between the alerts and the delays may be greater than the time required to warm up the subsystem device with the longest warm up duration. In some examples, the device power management alerts may be inserted before the device subsystem calls such that the duration between the alerts and the delays may be an average or mean of the subsystem device warm up durations.

As discussed, in some examples, the alert message may provide warning to a device subsystem to wake up from a standby state. In some examples, the alert message may provide a probability of use indication such that the device subsystem or the device operating system may determine a power vs. performance tradeoff for the device. For example, with a relatively high alert probability, the device subsystem may be powered up to be ready for a possible call while a relatively low alert probability, may leave the device subsystem in a standby mode.

As discussed, in some examples, the alert message may bring the device subsystem from a standby state to a ready state. In some examples, the alert may indicate to a device subsystem to come to an almost-ready or intermediate state such that the warm up duration may be shorter than the warm up duration from a full standby. Such examples may provide a power vs. performance compromise for the device. In some examples, the probability based alert messages and almost-ready warm up may be used in conjunction. In some examples, with a relatively high alert probability the device subsystem may be powered up to a full ready state, with a medium alert probability the device may be brought to an almost-ready state, and with a relatively low alert probability the device subsystem may remain in a standby mode.

In some examples, compiler 160 may also optionally insert device power management shut down alerts after device subsystem calls. As shown in FIG. 1, device power management shut down alerts 117, 137, 157 may be inserted in instruction stream 180 following device subsystem calls 115, 135, 155, respectively. The device power management shut down alerts following device subsystem calls may place the device subsystem into a powered down or standby state from a powered up or active state. In some examples, the device power management shut down alerts may be inserted after the device subsystem by a time duration (or clock cycle count) related to the duration of the task to be performed by the device subsystem. In other examples, the device power management shut down alerts may be inserted after the device subsystem by a constant time duration such that all shut down alerts are inserted in a uniform manner. In such examples, the time duration may be greater than or equal to the longest use duration related to a device subsystem call. In some examples, the device power management alerts may not be inserted. In such examples, the device may shut down device subsystems based on other device criteria such as a subsystem idle time or the like. The device shut down of device subsystem may be operated under control of the device operating system, for example.

As discussed, in some examples, compiler 160 may compile thin binary 105 to produce an instruction stream including a device power management alert. In general, compiler 160 may produce the device power management alert based on an evaluation of thin binary 105. In some examples, thin binary 105 may include instructions or modules having explicit calls to device subsystems. In such examples, compiler 160 may produce the device power management alert based on evaluating the call to the device subsystem. For example, the explicit device subsystem call may indicate a need for the device subsystem and the compiler may insert a power management alert based on the indicated need for the device subsystem. In some examples, thin binary 105 may include a device interrupt request. In some examples, a device interrupt request may be used to implement a device subsystem call. In some examples, compiler 160 may produce the device power management alert based on the device interrupt call indicating an implementation of the device subsystem. In such examples, compiler 160 may insert the device power management alert based on evaluating a device interrupt request.

In some examples, thin binary 105 may include other information indicating a device subsystem call. In some examples, thin binary 105 may include a library of methods that perform various functions. The library methods may include a keyword or keywords, such as, for example, "read" or "write", or the like. In such examples, compiler 160 may screen a library method or methods for keywords that may indicate the use of and a call to a device subsystem. Based on the keyword indicating the call to a device subsystem, the compiler may insert a device power management alert. In such examples, compiler 160 may insert the device power management alert based on screening a library method for the inclusion of a keyword. In some examples, the described screening techniques or other techniques may allow for the classification of Input/Output requests. In such examples, the classification of an Input/Output request may indicate the use or probable use of a device subsystem related to the request. In such examples, compiler 160 may insert the device power management alert based on classifying an Input/Output request.

In some examples, compiler 160 may insert the device power management alert based on evaluating meta information included in the thin binary. The thin binary, in some examples, may include meta information such as class and method names that may be provided such that flows and behavior may be extracted from the thin binary. In general, the meta information may be evaluated to determine whether it indicates the use of a device subsystem in the thin binary. In some examples, the compiler may determine a device subsystem use based on the meta information and provide a device power management alert based on the evaluation of the meta information.

In general, compiler 160 may include any suitable compiler system. In some examples, compiler 160 may be a complete compiler system provided on or to the device implementing method 100. In some examples, compiler 160 may be a general purpose compiler modified to include functionality for inserting device power management alerts. In some examples, compiler 160 may be modified to include device power management alert insertion module 170. In some examples, compiler 160 may include a just-in-time (JIT) compiler, which may indicate the compiler may be at the device and available to compile thin binary. In some examples, compiler 160 may include a just-in-time compiler including a device power management alert insertion module. In some examples, compiler 160 may include customizable modules. In some examples, some of the compiler modules may be modified to set device power management instructions either within the module or in a reference table. In some examples, the compiler modules may be modified hardware modules. In some examples, compiler 160 may be a modified dynamic optimization compiler such that the compiler may be optimized based on the structure of the specific local machine on which the instruction stream is to be executed. In some examples, compiler 160 may be a modified form of one of the following dynamic optimization compilers: a Transmeta Code Morphing™ compiler system, an IBM® DAISY compiler system, an HP® Dynamo compiler system, a Java® Virtual Machine compiler system, a Microsoft® .NET compiler system, or an Intel® IA32 Execution Layer compiler system.

As is further discussed herein, in some examples, instruction stream 180 may be executed to provide power management for a device. In some examples, the device receiving and compiling thin binary 105 to produce instruction stream 180 may be the same device that may execute the instruction stream for enhanced power management. In some examples, the device may be a mobile phone (e.g., a smartphone), a tablet device, a laptop computer, or any of the devices discussed herein.

In other examples, the thin binary may be compiled on a local intermediate device for execution at another device. For example, a laptop or desktop computer may compile a thin binary locally to produce an instruction stream that may be downloaded to a smartphone such that the smartphone may execute the instruction stream for enhanced power management. In such examples, the local intermediate compiling device and the execution device may be connected by any suitable communications coupling such as wireless or wired communications. In general, the local intermediate compiling device may have or may have access to information relating to the executing device. In some examples, the compiling device may have or may have local and immediate access to the specific hardware configuration of the executing device. In some examples, the local intermediate compiling device may have or have local and immediate access to the operating system configuration of the executing device. In some examples, the local intermediate compiling device may have or may have access to the information based on a local connection between the devices. In some examples, the local intermediate compiling device may access information related to the device by accessing a profile specific to the executing device. The local intermediate compiling device may access such a profile using any suitable techniques such as, for example, accessing a network or the Internet. In such examples, the local intermediate compiling device may be any suitable device that may be configured to compile a thin binary such as, for example, a desktop computer, a local server, a laptop computer, a mobile phone (e.g., a smartphone), a tablet device, or any of the devices discussed herein. The executing device may be any device suitable for executing the instruction stream to implement the power management techniques discussed herein, such as, for example, a mobile phone (e.g., a smartphone), a tablet device, a laptop computer, or any of the devices discussed herein. In such examples, the instruction stream produced by the thin binary compiled by the local intermediate compiling device may include instructions that may not be compatible for execution at the local intermediate compiling device and/or any other general purpose device outside of the executing device.

The techniques discussed herein may provide a variety of advantages. For example, inserting alerts at the compiler level may offer the advantage of having visibility to the functional and procedural techniques of applications. The compiler may access information related to register calls and the loops and flows of the thin binary. Also, implementing alerts during the compilation of a thin binary may provide highly hardware dependent alerts while allowing applications to be implemented in their current form. Further, the techniques discussed may be backwards compatible to existing devices, operating systems, and applications.

FIG. 2 is an illustration of a flow chart of an example method 200 for providing power management at a device, arranged in accordance with at least some embodiments of the present disclosure. Method 200 may include one or more functions, operations or actions as illustrated by one or more of blocks 210, 220, and/or 230. In some examples, method 200 may be implemented at a device such as, for example, a mobile phone (e.g., a smartphone), a tablet device, or a laptop computer, or the like. The process of method 200 may begin at block 210.

At block 210, "Receive a Thin Binary Including a Call to a Device Subsystem", a thin binary may be received at the device. The thin binary may include any of the thin binaries discussed herein, such as, for example, a thin binary code, a partially compiled code or a partially compiled script. In some examples, the thin binary may be received as a download to the device. The thin binary may be received at the device via any suitable communications method, such as, for example, a local network connection, a Bluetooth connection, an infrared connection, or a USB connection, or the like. The thin binary may be received from any suitable downloading device, devices, or entity, such as for example, a computer, a server, a network, a memory device, the Internet, or the like. As discussed above, the thin binary may include a call or calls to a device subsystem or subsystems. The device subsystem call or calls may include any of those discussed herein. Method 200 may continue at block 220.

At block 220, "Compile the Thin Binary to Produce an Instruction Stream Having a Device Power Management Alert", the received thin binary may be compiled to produce an instruction stream. In some examples, the thin binary may be compiled at the device by a compiler. The thin binary may be compiled in any manner and by any compiler discussed herein. The resultant instruction stream may include any power management alerts as discussed herein. Method 200 may continue at block 230.

At block 230, "Execute the Instruction Stream at the Device", the resultant instruction stream may be executed at the device. The instruction stream having device power management alerts may provide power management for the executing device. The device power management alerts may be implemented in the instruction stream in any suitable manner. In some examples, the device power management alerts may include register setting commands. The register setting commands may set a register within the device to indicate the device subsystem is to be powered up. In some examples, the device may include a device power management system or subsystem. In such examples, the register setting command may set a register within the device power management system to indicate the device subsystem is to be powered up.

As discussed, the techniques discussed herein may provide device power management for a device. In some examples, the techniques discussed herein may be used with other device power management techniques. In some examples, the power management techniques discussed herein may be used in device power management techniques that may be provided by various hardware components or by the device operating system. For example, the device operating system may monitor application behavior and adjust power settings accordingly. Such methods may be used in combination with the device subsystem alerts discussed herein.

As discussed with respect to FIG. 2, in some example methods, a thin binary may be received, compiled and executed at a device. In other examples, the thin binary may be received at local intermediate compiler device which may compile the thin binary to provide an instruction stream. The instruction stream may be transferred by the local intermediate compiler device and received by an execution device. In general, the local intermediate compiler device may have or have access to information related to the executing device, as described herein. The instruction stream may be received at the execution device by any suitable communication technique for execution. Execution of the instruction stream may provide device power management at the execution device.

Figure 3:
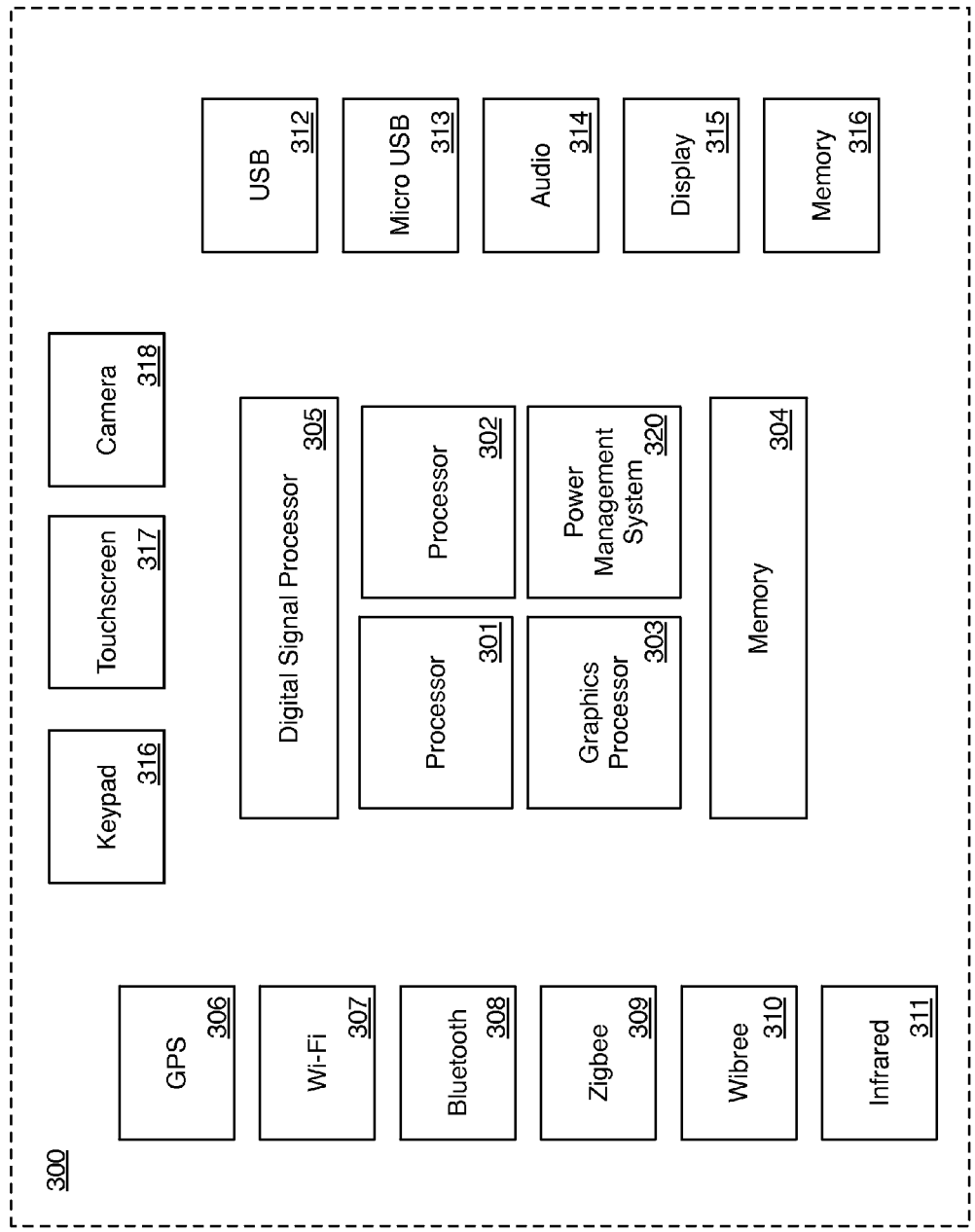
FIG. 3 is an illustration of a block diagram of an example device that may include power management.

FIG. 3 is an illustration of a block diagram of an example device 300 that may include power management, arranged in accordance with at least some embodiments of the present disclosure. In general, device 300 may be any suitable device. In some examples, device 300 may be a mobile phone (e.g., a smartphone), a tablet device, or a laptop computer. In some examples, device 300 may be a smartphone implementing the Android operating system. As shown in FIG. 3, device 300 may include a variety of components. In general, device 300 may include some or all of the components shown in FIG. 3. As shown, device 300 may include a processor 301 and a processor 302. In some examples, processors 301, 302 may be coprocessors. In other examples, device 300 may include one processor. In some examples, device 300 may include three or more processors. In some examples, device 300 may include a multicore processor or processors. Device 300 may also include a graphics processor 303, a memory 304 and a digital signal processor 305. In general, processors 301, 302, graphics processor 303, memory 304 and digital signal processor 305 may provide core functionality for device 300.

As illustrated in FIG. 3, device may also include a power management system 320 which may provide the power management functionality discussed herein. In some examples, power management system 320 may include a hardware implementation of the power management functionality discussed herein. In some examples, the power management alerts discussed herein may be implemented as changed register states within power management system 320.

In general, the power management techniques discussed herein may be provided at device 300. In some examples, the compiling methods discussed with respect to FIG. 1 and elsewhere herein may be provided by processor 301 and/or processor 302. In some examples, the thin binary discussed herein may be stored in memory 304 and accessed for compilation by processor 301 and/or processor 302. In some examples, a post-compilation instruction stream may be stored in memory 304. In some examples, the instruction stream execution as described with respect to FIG. 2 and elsewhere herein may be performed by components of device 300. In some examples, the execution stream may be stored in memory 304 and the execution may be performed by processor 301 and/or processor 302. In some examples, the execution of the instruction stream may provide power management for device 300 through a hardware implementation at power management system 320.

As shown, device 300 may also include one or more of a global positioning system 306, a Wi-Fi® subsystem 307, an Infrared port 311, a Uniform Serial Bus (USB) port 312, a Micro Uniform Serial Bus (MicroUSB) port 313, an audio subsystem 314, a display subsystem 315, a memory subsystem 316, a Bluetooth® radio 308, a ZigBee® radio 309, a Wibree™ radio 310, a keyboard subsystem 316, a touchscreen subsystem 317, or a camera subsystem 318. Device 300 may also include one or more bridges and/or bridge portions for providing communication between the components of device 300, which are not shown for the sake of clarity. The components of device 300 may be provided in any suitable manner. In some examples, various components of device 300 may be provided on the same substrate in a system-on-a-chip implementation. In some examples, various device components may be provided as discrete components, chipsets, or the like. The discrete components may be provided on a printed circuit board or other suitable substrate.

As discussed, device 300 may operate using the power management techniques discussed herein. In some examples, the power management techniques may include compiling a thin binary to provide an instruction stream with device power management alerts inserted therein. A device power management alert may be inserted before a device subsystem call such that the alert may wake the device subsystem to a ready state before the call to the device subsystem. In general, the subsystem addressed by the alert and the call may be any suitable subsystem of the device. In some examples, power management system 320 may communicate with the subsystem over a bridge or other communications link. In some examples, the subsystem put into a powered down state and to be awoken by an alert may be any one of the following: global positioning system 306, Wi-Fi® subsystem 307, Bluetooth® radio 308, ZigBee® radio 309, Wibree™ radio 310, Infrared port 311, Uniform Serial Bus (USB) port 312, Micro Uniform Serial Bus (MicroUSB) port 313, audio subsystem 314, display 315, memory subsystem 316, keyboard subsystem 316, touchscreen subsystem 317, camera subsystem 318, or any subsystem discussed herein. In some examples, the subsystem held in standby until an alert may be one of processor 301 and/or processor 302. In some examples, the subsystem held in standby may be graphics processor 303. In some examples, the subsystem held in standby may be a bridge or a portion of a bridge.

In general, the device subsystems to be held in standby mode discussed may be include any suitable implementations of those device subsystems and the subsystems may include the suitable component or components to provide the subsystem functionality. For example, global positioning system 306, Wi-Fi® subsystem 307, Bluetooth® radio 308, ZigBee® radio 309 and/or Wibree™ radio 310 may include suitable antennas, receivers, and/or logic. Audio subsystem 314 may include, for example, speakers, electrical leads, drivers, amplifiers, or the like. Memory subsystem 316 may include, for example, a hard disk, a solid state memory, or the like. As will be appreciated, a wide range of components and implementations may be used for the device subsystems discussed herein. In some examples, the entire device subsystem may be put into a standby mode and the entire device subsystem may be awoken with a device subsystem warning or alert as discussed herein. In other examples, a portion of the device subsystem may be put into a standby mode such that other portions of the subsystem may not be put into standby mode.

As discussed, device 300 may be implemented in any suitable manner such as, for example, using system-on-a-chip techniques, discrete components, or chipsets, or the like. In some examples, the device subsystem to be held in a standby may be considered a subsystem hardware implementation. For example, a subsystem may be implemented as a chip set.

In such examples, the chipset may be placed into a powered down state to be awoken by an alert. In some examples, a subsystem may be implemented as a portion of a device or a portion of a hardware implementation. For example, one or both of processors 301, 302 may include floating point units or integer operation units. In some examples, those portions may be subsystems that may be placed into standby. In some examples, a floating point unit may be powered down to be awoken by an alert. In some examples, an integer operation unit may be powered down to be awoken by an alert.

As discussed, device 300 may be any suitable device for which power management techniques may be provided such as, for example a mobile phone (e.g., a smartphone), a tablet device, a laptop computer, or the like. In some examples, the device may include an operating system or a software application that may provide an environment that utilizes the thin binary and just-in-time compiler techniques discussed. In some examples, a web browser may compile thin binary using a just-in-time compiler for use at a device. In some examples, the Chrome Operating System may utilize such an architecture. In some examples, HyperText Markup Language 5 (HTML5) may utilize such an architecture. As discussed herein, a device may include any operating system or software application that may allow for a thin binary and just-in-time compiler implementation. In such examples, the compiler used by the operating system or the software application may be modified to include a device power management alert insertion module as discussed with respect to FIG. 1.

FIG. 4 illustrates an example computer program product 400, arranged in accordance with at least some embodiments of the present disclosure. Computer program product 400 may include machine readable non-transitory medium having stored therein a plurality of instructions that, when executed, cause the machine to provide device power management according to the processes and methods discussed herein. Computer program product 400 may include a signal bearing medium 402. Signal bearing medium 402 may include one or more machine-readable instructions 404, which, when executed by one or more processors, may operatively enable a computing device to provide the functionality described herein. In various examples, some or all of the machine-readable instructions may be used by the devices discussed herein.

In some implementations, signal bearing medium 402 may encompass a computer-readable medium 406, such as, but not limited to, a hard disk drive, a Compact Disc (CD), a Digital Versatile Disk (DVD), a digital tape, memory, etc. In some implementations, signal bearing medium 402 may encompass a recordable medium 408, such as, but not limited to, memory, read/write (R/W) CDs, R/W DVDs, etc. In some implementations, signal bearing medium 402 may encompass a communications medium 410, such as, but not limited to, a digital and/or an analog communication medium (e.g., a fiber optic cable, a waveguide, a wired communication link, a wireless communication link, etc.). In some examples, signal bearing medium 402 may encompass a machine readable non-transitory medium.

Figure 5:
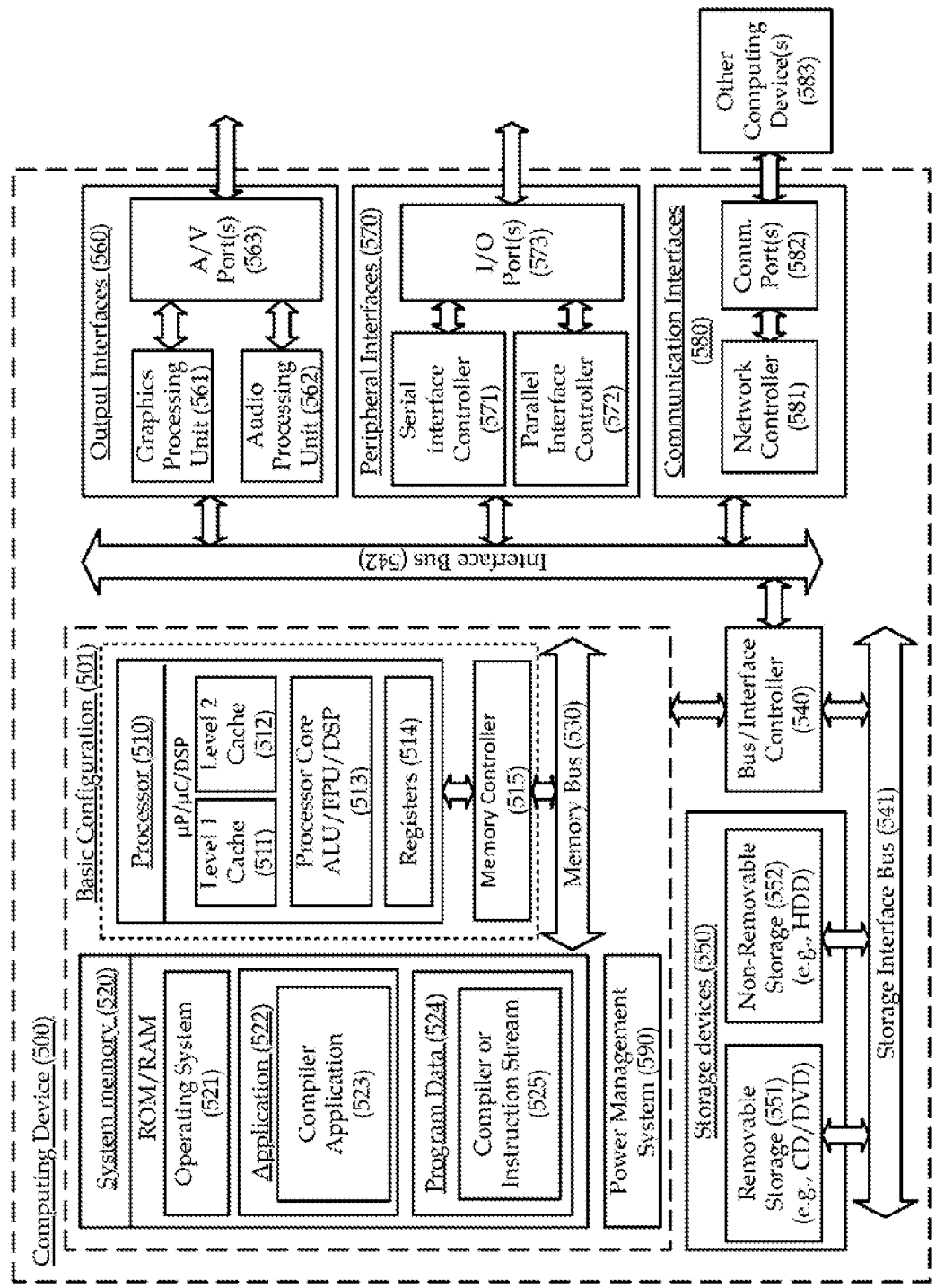
FIG. 5 is an illustration of a block diagram of an example computing device, all arranged in accordance with at least some embodiments of the present disclosure.

FIG. 5 is a block diagram illustrating an example computing device 500, arranged in accordance with at least some embodiments of the present disclosure. In various examples, computing device 500 may be configured to provide the device power management operations discussed herein. In various examples, computing device 500 may be configured to provide or control the compilation and/or instruction stream execution as discussed herein. In general, any component or subsystem of computing device 500 may be placed in a powered down state to be awoken by a power management alert prior to a call to the subsystem using the techniques described herein. In an example, the devices discussed with respect to FIG. 3 may be provided as a part of computing device 500. In one example basic configuration 501, computing device 500 may include one or more processors 510 and system memory 520. A memory bus 530 can be used for communicating between the processor 510 and the system memory 520. In some examples, basic configuration 501 may include a power management system 590. Power management system 590 may include a hardware implementation of the power management techniques discussed herein. In some examples, power management system 590 may implement the power management techniques discussed herein by changing registers within power management system 590.

Depending on the desired configuration, processor 510 may be of any type including but not limited to a microprocessor (µP), a microcontroller (µC), a digital signal processor (DSP), or any combination thereof. Processor 510 can include one or more levels of caching, such as a level one cache 511 and a level two cache 512, a processor core 513, and registers 514. The processor core 513 can include an arithmetic logic unit (ALU), a floating point unit (FPU), a digital signal processing core (DSP Core), or any combination thereof. A memory controller 515 can also be used with the processor 510, or in some implementations the memory controller 515 can be an internal part of the processor 510.

Depending on the desired configuration, the system memory 520 may be of any type including but not limited to volatile memory (such as RAM), non-volatile memory (such as ROM, flash memory, etc.) or any combination thereof. System memory 520 may include an operating system 521, one or more applications 522, and program data 524. Application 522 may include compiler application 523 that can be arranged to perform the functions, actions, and/or operations as described herein including the functional blocks, actions, and/or operations described herein. Program Data 524 may include compiler or instruction stream data 525 for use with compiler application 523. In some example embodiments, application 522 may be arranged to operate with program data 524 on an operating system 521. This described basic configuration is illustrated in FIG. 5 by those components within dashed line 501.

Computing device 500 may have additional features or functionality, and additional interfaces to facilitate communications between the basic configuration 501 and any required devices and interfaces. For example, a bus/interface controller 540 may be used to facilitate communications between the basic configuration 501 and one or more data storage devices 550 via a storage interface bus 541. The data storage devices 550 may be removable storage devices 551, non-removable storage devices 552, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 520, removable storage 551 and non-removable storage 552 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 500. Any such computer storage media may be part of device 500.

Computing device 500 may also include an interface bus 542 for facilitating communication from various interface devices (e.g., output interfaces, peripheral interfaces, and communication interfaces) to the basic configuration 501 via the bus/interface controller 540. Example output interfaces 560 may include a graphics processing unit 561 and an audio processing unit 562, which may be configured to communicate to various external devices such as a display or speakers via one or more NV ports 563. Example peripheral interfaces 570 may include a serial interface controller 571 or a parallel interface controller 572, which may be configured to communicate with external devices such as input devices (e.g., keyboard, mouse, pen, voice input device, touch input device, etc.) or other peripheral devices (e.g., printer, scanner, etc.) via one or more I/O ports 573. An example communication interface 580 includes a network controller 581, which may be arranged to facilitate communications with one or more other computing devices 583 over a network communication via one or more communication ports 582. A communication connection is one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR) and other wireless media. The term computer readable media as used herein may include both storage media and communication media.

Computing device 500 may be implemented as a portion of a small-form factor portable (or mobile) electronic device such as a cell phone, a mobile phone, a tablet device, a laptop computer, a personal data assistant (PDA), a personal media player device, a wireless web-watch device, a personal headset device, an application specific device, or a hybrid device that includes any of the above functions. Computing device 500 may also be implemented as a personal computer including both laptop computer and non-laptop computer configurations. In addition, computing device 500 may be implemented as part of a wireless base station or other wireless system or device.

Some portions of the foregoing detailed description are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing device, that manipulates or transforms data represented as physical electronic or magnetic quantities within memories, registers, or other information storage devices, transmission devices, or display devices of the computing device.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In some embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a flexible disk, a hard disk drive (HDD), a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communication link, a wireless communication link, etc.).

The herein described subject matter sometimes illustrates different components contained within, or connected with, different other components. It is to be understood that such depicted architectures are merely examples and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While certain example techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

What is claimed:

1. A method for providing power management at a device comprising:
   receiving a thin binary at the device via a communication link configured to receive communications from a remote source, wherein the thin binary includes a call to a device subsystem;
   storing the thin binary;
   compiling the thin binary at the device to produce an instruction stream including a device power management alert for the device subsystem inserted in the instruction stream before the call to the device subsystem, wherein the device power management alert comprises a probability of use indication for the device subsystem; and
   executing the instruction stream at the device, wherein the device subsystem is powered up from a shut down state in response to the power management alert in the instruction stream being executed.

2. The method of claim 1, wherein the device power management alert is inserted in the instruction stream before the call to the device subsystem such that a duration between execution of the power management alert and execution of the call to the device subsystem is greater than a warm up duration of the device subsystem.

3. The method of claim 1, wherein the compiling comprises producing the device power management alert based on at least one of screening a library method for the inclusion of a keyword, evaluating meta information included in the thin binary, classifying an Input/Output request, evaluating a device interrupt request, or evaluating the call to the device subsystem.

4. The method of claim 1, wherein the compiling is performed by a just-in-time compiler including a device power management alert insertion module.

5. The method of claim 4, wherein the just-in-time compiler comprises at least one of a Transmeta Code Morphing compiler system, a IBM DAISY compiler system, an HP Dynamo compiler system, a Java Virtual Machine compiler system, a Microsoft .NET compiler system, or an Intel IA32 Execution Layer compiler system modified to include the device power management alert insertion module.

6. The method of claim 1, wherein the thin binary comprises a second call to a second device subsystem, and wherein the compiling the thin binary includes inserting a second device power management alert for the second device subsystem in the instruction stream before the call to the second device subsystem.

7. The method of claim 6, wherein the executing the instruction stream at the device causes the second device subsystem to be powered up from a shut down state in response to the second power management alert in the instruction stream being executed.

8. The method of claim 1, wherein the instruction stream includes a device power management shut down alert for the device subsystem inserted in the instruction stream after the call to the device subsystem.

9. The method of claim 1, wherein the device comprises at least one of a mobile phone, a tablet device, or a laptop computer.

10. The method of claim 1, wherein the device power management alert comprises a register setting command that sets a register within a device power management system of the device that indicates the device subsystem is to be powered up.

11. The method of claim 1, wherein the thin binary comprises at least one of a partially compiled binary code, a partially compiled script, a Java bytecode, or a .NET dynamic optimization code.

12. The method of claim 1, wherein the device subsystem comprises at least one of a Wi-Fi subsystem, an Infrared port, a Uniform Serial Bus (USB) port, a Micro Uniform Serial Bus (MicroUSB) port, a speaker, a disk drive, a Bluetooth radio, a ZigBee radio, a Wibree radio, a memory device, a bridge, a portion of a bridge, a digital signal processor, a graphics processor, a chipset, a coprocessor, a floating point unit, or an integer operation unit.

13. A machine readable non-transitory medium having stored therein instructions that, when executed at a device, provide power management for the device by:
receiving a thin binary at the device from a remote source, wherein the thin binary includes a call to a device subsystem;
storing the thin binary;
compiling the thin binary at the device to produce an instruction stream including a device power management alert for the device subsystem inserted in the instruction stream before the call to the device subsystem wherein insertion of the device power management alert received at the device is performed by a device power management alert insertion module and wherein the device power management alert comprises a probability of use indication for the device subsystem; and
executing the instruction stream at the device, wherein the device subsystem is powered up from a shut down state in response to the power management alert in the instruction stream being executed.

14. The machine readable non-transitory medium of claim 13, wherein the device power management alert is inserted in the instruction stream before the call to the device subsystem such that a duration between execution of the power management alert and execution of the call to the device subsystem is greater than a warm up duration of the device subsystem.

15. The machine readable non-transitory medium of claim 13, wherein the compiling comprises producing the device power management alert based on at least one of screening a library method for the inclusion of a keyword, evaluating meta information included in the thin binary, classifying an Input/Output request, evaluating a device interrupt request, or evaluating the call to the device subsystem.

16. The machine readable non-transitory medium of claim 13, wherein the compiling is performed by a just-in-time compiler comprising at least one of a Transmeta Code Morphing compiler system, a IBM DAISY compiler system, an HP Dynamo compiler system, a Java Virtual Machine compiler system, a Microsoft .NET compiler system, or an Intel IA32 Execution Layer compiler system modified to include a device power management alert insertion module.

17. The machine readable non-transitory medium of claim 13, wherein the instruction stream includes a device power management shut down alert for the device subsystem inserted in the instruction stream after the call to the device subsystem.

18. The machine readable non-transitory medium of claim 13, wherein the device subsystem comprises at least one of a Wi-Fi subsystem, an Infrared port, a Uniform Serial Bus (USB) port, a Micro Uniform Serial Bus (MicroUSB) port, a speaker, a disk drive, a Bluetooth radio, a ZigBee radio, a Wibree radio, a memory device, a bridge, a portion of a bridge, a digital signal processor, a graphics processor, a chipset, a coprocessor, a floating point unit, or an integer operation unit.

19. A device comprising:
a machine readable medium having stored therein instructions that, when executed, cause the device to provide power management for the device by:
receiving from a source external to the device a thin binary at the device, wherein the thin binary includes a call to a device subsystem;
storing the thin binary;
compiling the thin binary at the device to produce an instruction stream including a device power management alert for the device subsystem inserted in the instruction stream before the call to the device subsystem, wherein the device subsystem is powered up from a shut down state in response to the power management alert in the instruction stream being executed wherein insertion of the device power management alert received at the device is performed by a device power management alert insertion module and wherein the device power management alert comprises a probability of use indication for the device subsystem; and
a processor coupled to the machine readable medium to execute the instruction stream.

20. The device of claim 19, wherein the device power management alert is inserted in the instruction stream before the call to the device subsystem such that a duration between execution of the power management alert and execution of the call to the device subsystem is greater than a warm up duration of the device subsystem.

21. The device of claim 19, wherein the compiling comprises producing the device power management alert based on at least one of screening a library method for the inclusion of a keyword, evaluating meta information included in the thin binary, classifying an Input/Output request, evaluating a device interrupt request, or evaluating the call to the device subsystem.

22. The device of claim 19, wherein the compiling is performed by a just-in-time compiler comprising at least one of a Transmeta Code Morphing compiler system, a IBM DAISY compiler system, an HP Dynamo compiler system, a Java Virtual Machine compiler system, a Microsoft .NET compiler system, or an Intel IA32 Execution Layer compiler system modified to include a device power management alert insertion module.

23. The device of claim 19, wherein the instruction stream includes a device power management shut down alert for the device subsystem inserted in the instruction stream after the call to the device subsystem.

24. The device of claim 19, wherein the device subsystem comprises at least one of a Wi-Fi subsystem, an Infrared port, a Uniform Serial Bus (USB) port, a Micro Uniform Serial Bus (MicroUSB) port, a speaker, a disk drive, a Bluetooth radio, a ZigBee radio, a Wibree radio, a memory device, a bridge, a portion of a bridge, a digital signal processor, a graphics processor, a chipset, a coprocessor, a floating point unit, or an integer operation unit.

* * * * *